United States Patent [19]
Hsu

[11] Patent Number: 5,785,598
[45] Date of Patent: Jul. 28, 1998

[54] SOFTWARE CARTRIDGE BEING EXTENSIBLE WITH ADDITIONAL PROGRAMS AND/OR DATA AND THE METHOD OF FABRICATING THE SAME

[75] Inventor: Jerry Hsu, Yunlin Hsien, Taiwan

[73] Assignee: United Microelectronics Corporation, Hsinchu, Taiwan

[21] Appl. No.: 666,640

[22] Filed: Jun. 18, 1996

[51] Int. Cl.$^6$ .................................................. A63F 9/00
[52] U.S. Cl. .................................................. 463/44
[58] Field of Search .................................. 463/43, 44, 45

[56] References Cited

U.S. PATENT DOCUMENTS

| Re. 34,161 | 1/1993 | Nakagawa et al. | 463/44 |
|---|---|---|---|
| 5,556,108 | 9/1996 | Nagano et al. | 463/45 |
| 5,599,232 | 2/1997 | Darling | 463/44 |

OTHER PUBLICATIONS

Computer Graphics World, Jan. 1995, p. 20, "Sega Conquers Time Travel".

*Primary Examiner*—George Manuel
*Attorney, Agent, or Firm*—Ladas & Parry

[57] ABSTRACT

A software cartridge which is extensible with additional programs and/or data and the method of fabricating the same are provided. The software cartridge may connect with an add-on cartridge including additional data and/or programs of at least one game. A game console connected with the software cartridge and the add-on cartridge determines whether the additional game data stored in the add-on cartridge support the game of the software cartridge under control of the control programs stored in the software cartridge, and then use the additional program and/or data which support the game to enhance the content of the game.

18 Claims, 9 Drawing Sheets

SOFTWARE CARTRIDGE BEING EXTENSIBLE WITH ADDITIONAL PROGRAMS AND/OR DATA AND THE METHOD OF FABRICATING THE SAME

BACKGROUND OF THE INVENTION

1. Field of the Invention

The present invention relates to a software cartridge. In particular, the present invention relates to a software cartridge being extensible with additional programs and/or data and the method of fabricating the same.

2. Description of Prior Art

Currently, a normal video game machine that comes into the market comprises a game console and a software cartridge which is mostly an attachable and detachable cartridge. When a customer purchases a certain kind of game console for a video game machine, he can buy some software cartridges adapted to the game console that he has purchased. Refer to FIG. 1 which illustrates the block diagram of a typical video game machine. The video game machine includes a game console 10, a software cartridge 20 and a controller 40 (e.g., a joystick). The software cartridge 20 connects with the game console 10 by a bus 30. Furthermore, the game console 10 comprises: a CPU (central processing unit) 11, e.g., a Motorola 68000 chip; a picture processing unit 12; a programmable sound generator 13; a RAM (random access memory) 14, e.g., a SRAM; and an television signal synthesizer 15 including a RAMDAC and a phase modulator. The software cartridge 20 includes a ROM (read only memory) 21 and other circuitry (not shown). When the video game machine is operated, address signals supplied by the CPU 11 are transmitted to the ROM 21 by the bus 30 to read out the program and the data stored in the ROM 21. Then the data from the ROM 21 is respectively sent to and processed by the picture processing unit 12 and the programmable sound generator 13. Thereafter, the picture processing unit 12 generates video signals and the programmable sound generator 13 generates audio signals, respectively. The audio signals are directly sent to a TV set 18. The video signals are sent to the television signal synthesizer 15 including a RAMDAC and a phase modulator, and being synthesized and transformed into television signals, for example, NTSC (national television system committee) signals or PAL (phase alternation line) signals, then sent to the TV set 18. During operation of the video game machine, the CPU 11 can retrieve control signals from the controller 40 to control the playing of a video game. In the operating procedures of a video game machine described above, the game data of the video game machine including graphic data, sound data and game procedures are stored in the ROM 21. However, none of today's software cartridges are provided with the function of memory extending. In other words, the data and programs stored in the ROM of the software cartridge can not be changed to meet the needs of customers after the software cartridge is manufactured. Even if the game has merely changed a little, such as when new characters, new barriers, etc., are added, the customers need to buy a new cartridge.

To overcome the drawbacks, a new method was reported in page 22 of "Computer Graphic World" Jan. 1995, which employs a newly designed cartridge to extend the data and programs. Consequently, the proposed method can make a new character of the newly designed cartridge go back in the previous games. It reads the signature codes of those games, then modifies the games' executable codes according to the initial signature code that comes up. This new method permits a newly designed cartridge to take over the control of the previous games. This approach, however, requires the addition of new control programs in the newly designed cartridge to identify the category of the previous games and take over control of the games. As a result, the compatibility of a newly designed cartridge with the previous cartridges is degraded, and manufacturing a newly designed cartridge becomes complex. Moreover, the appearance of the disclosed cartridge would to be as shown in FIG. 3A, that is the newly designed cartridge must be plugged into the game console at first, then the previous cartridge can be connected to the game console via the newly designed cartridge.

SUMMARY OF THE INVENTION

It is therefore an object of the present invention to provide a software cartridge which is extensible with additional data and/or programs and the method for fabricating the same, in which the original cartridge always takes over the control of the games while connecting with a newly designed cartridge.

One aspect of the present invention is that a newly designed cartridge may only contain data of different kinds of games but no programs. Therefore, a newly designed cartridge can be worked out without hardware's support since the newly designed cartridge does not take over the control of the game.

The approach of the present invention is that the control programs are built-in while designing the original cartridge of a new game. Then the cartridge having built-in control programs can identify a newly designed cartridge, take over the control of the games and access the data and programs of the newly designed cartridge if the data and programs stored in the newly designed cartridge conform to a predetermined format. Consequently, the original cartridge is well compatible with any newly designed cartridge conforming to the predetermined format. The newly designed cartridge can store data and/or programs supporting different kinds of games, and the initial cost of a newly designed cartridge is hence reduced.

This technology involves building control programs in a primary cartridge, which can perform the following operations: (i) checking for the existence of a secondary (add-on) cartridge after the game console is on, and proceeding the game according to the data and programs of the primary cartridge if there is no secondary cartridge connected to the primary cartridge; (ii) if there is a secondary cartridge connected to the primary cartridge, accessing the data representing the number of games supported by the secondary cartridge first; (iii) then, determining whether the data and/or programs of the secondary cartridge support the game of the primary cartridge or not, that is, to compare the signature of the primary cartridge with the signature(s) of the game data stored in the secondary cartridge, whereby the game console performing the control programs of the primary cartridge can access the secondary cartridge if there is a signature in the secondary cartridge identical with the signature of the primary cartridge.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
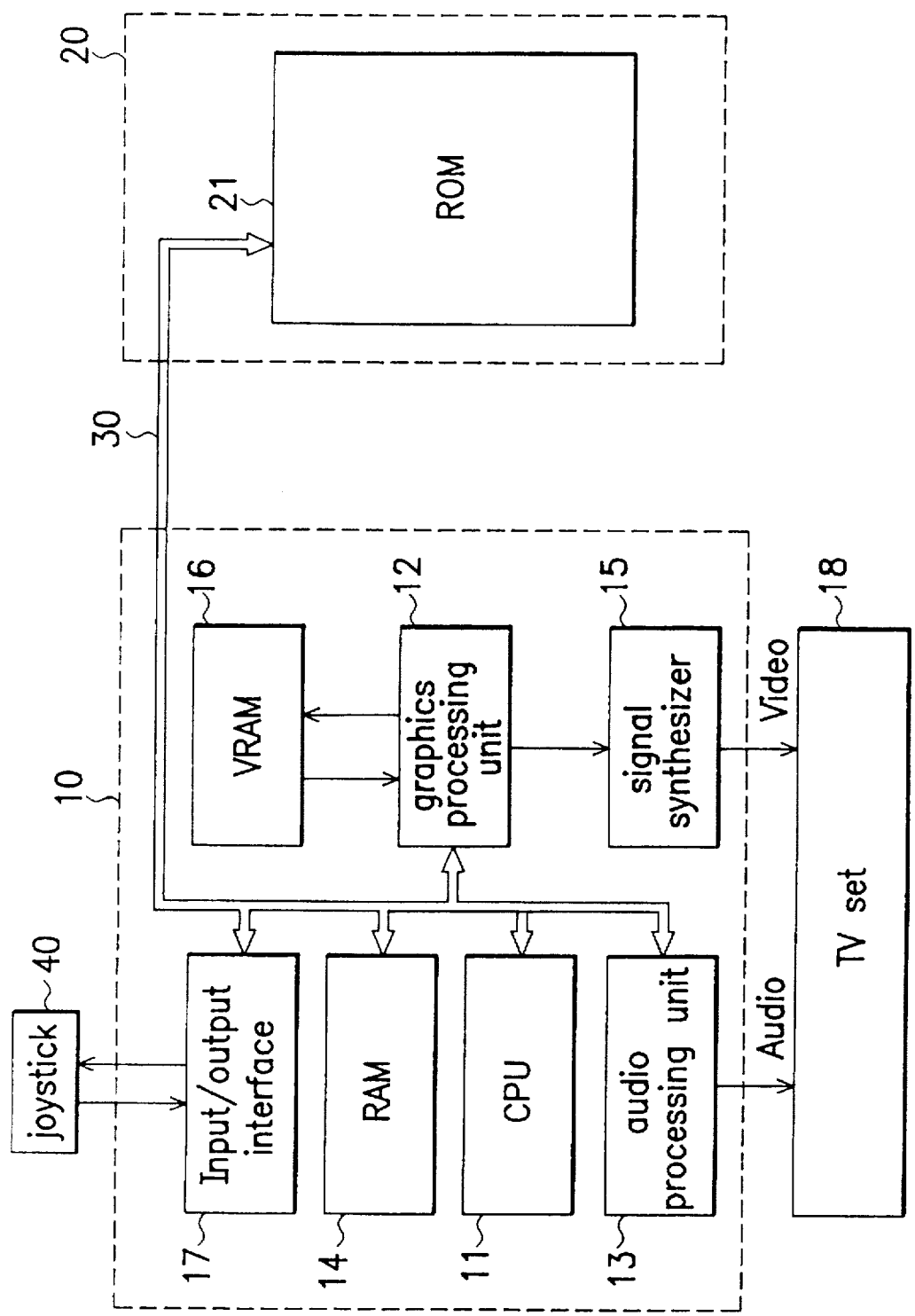
FIG. 1 is a block diagram illustrating the game console and the cartridge of a conventional television game console.
Figure 2:
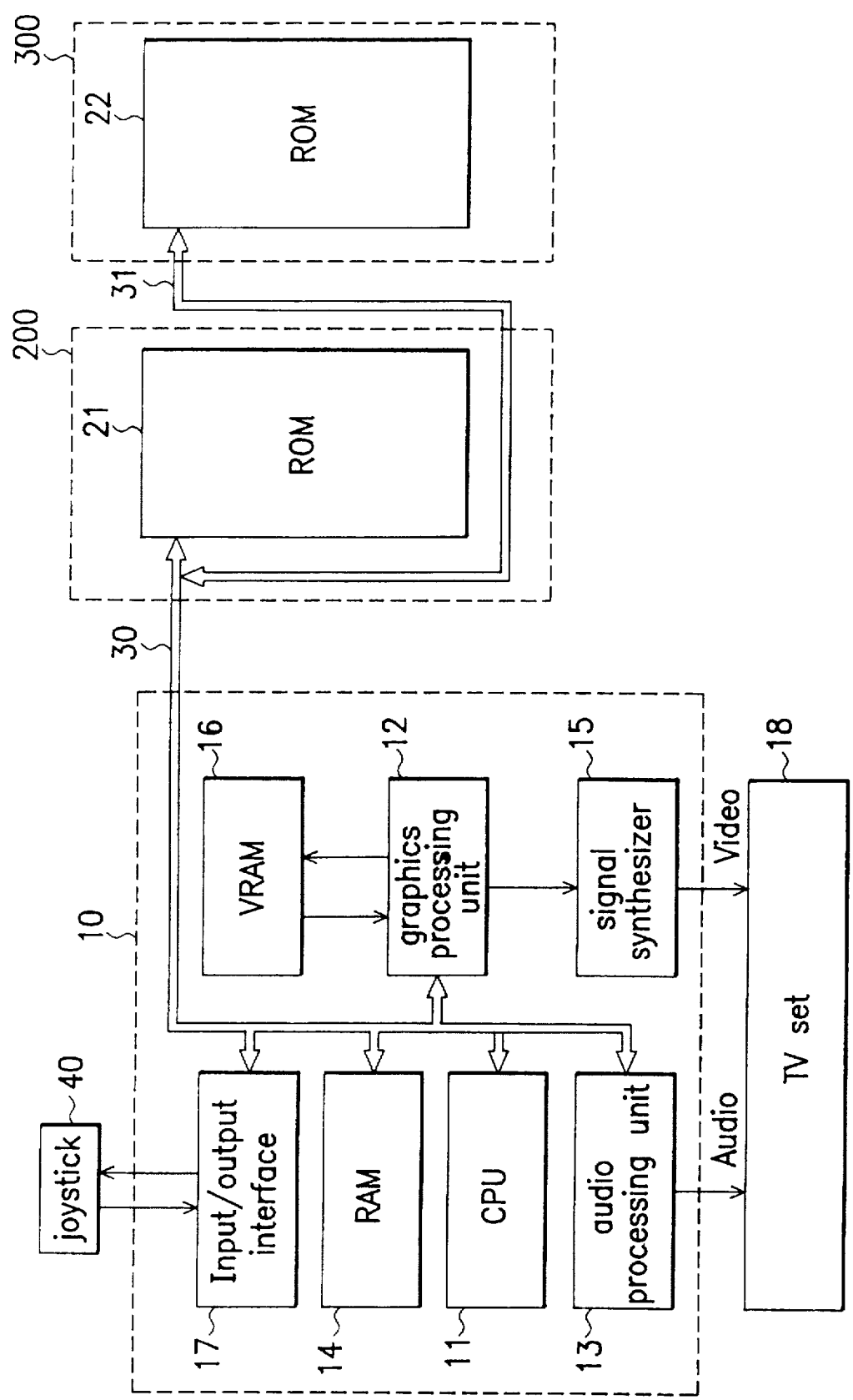
FIG. 2 is a block diagram of a preferred embodiment according to the present invention.

Referring to FIG. 2, which illustrates the connections among the add-on (secondary) cartridge 300, the control (primary) cartridge 200 and the game console 10. The primary cartridge 200 connects to the game console 10 via the bus 30. The game console 10 is a conventional one, which includes: a central processing unit 11 (e.g., a Motorola 68000), a graphics processing unit 12, an audio processing unit 13, a random access memory (RAM) 14, a television signal synthesizer 15 including a RAMDAC and a phase modulator, a video RAM 16, and an input/output interface 17. The RAMDAC and phase modulator convert the output of graphic processing unit 12 to the video signal for a TV set 18. The audio processing unit 13 also generates audio signals such as music and speech to the TV set 18. The control cartridge 200 is similar to a conventional software cartridge, which mainly includes a ROM 21. However, the control program stored in the control cartridge 200 is quite different from conventional ones. The add-on cartridge 300 mainly includes a ROM 22 for storing the adding data and/or programs. The add-on cartridge 300 is connected to the central processing unit 11 of the game console 10 through the buses 31 and 30.

When the game console 10 is on, the control cartridge 200 takes over the control for the game console 10 first, then the central processing unit 11 begins to perform the control program to determine whether there is an add-on cartridge connected to the control cartridge 200 or not. If an add-on cartridge is connected to the control cartridge 200, the central processing unit 11 further determines whether the data stored in the add-on cartridge supports the game of the control cartridge 200 or not. If the answer is yes, the central processing unit 11 then retrieves the data and/or programs stored in the add-on cartridge according to the control program stored in the control cartridge 200.

Figure 3A:
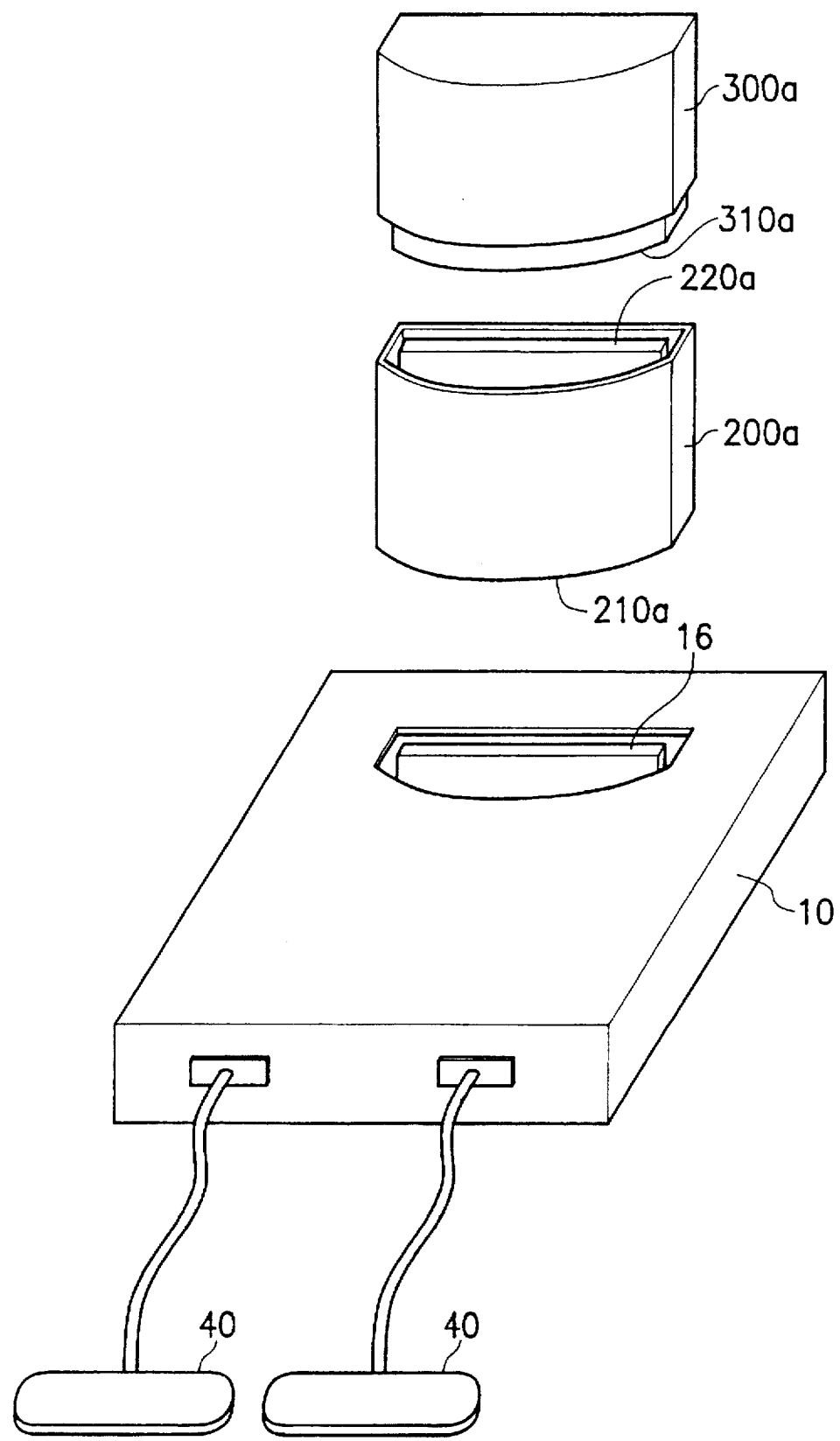
FIG. 3A is a perspective exploded diagram of a preferred embodiment according to the present invention.
Figure 3B:
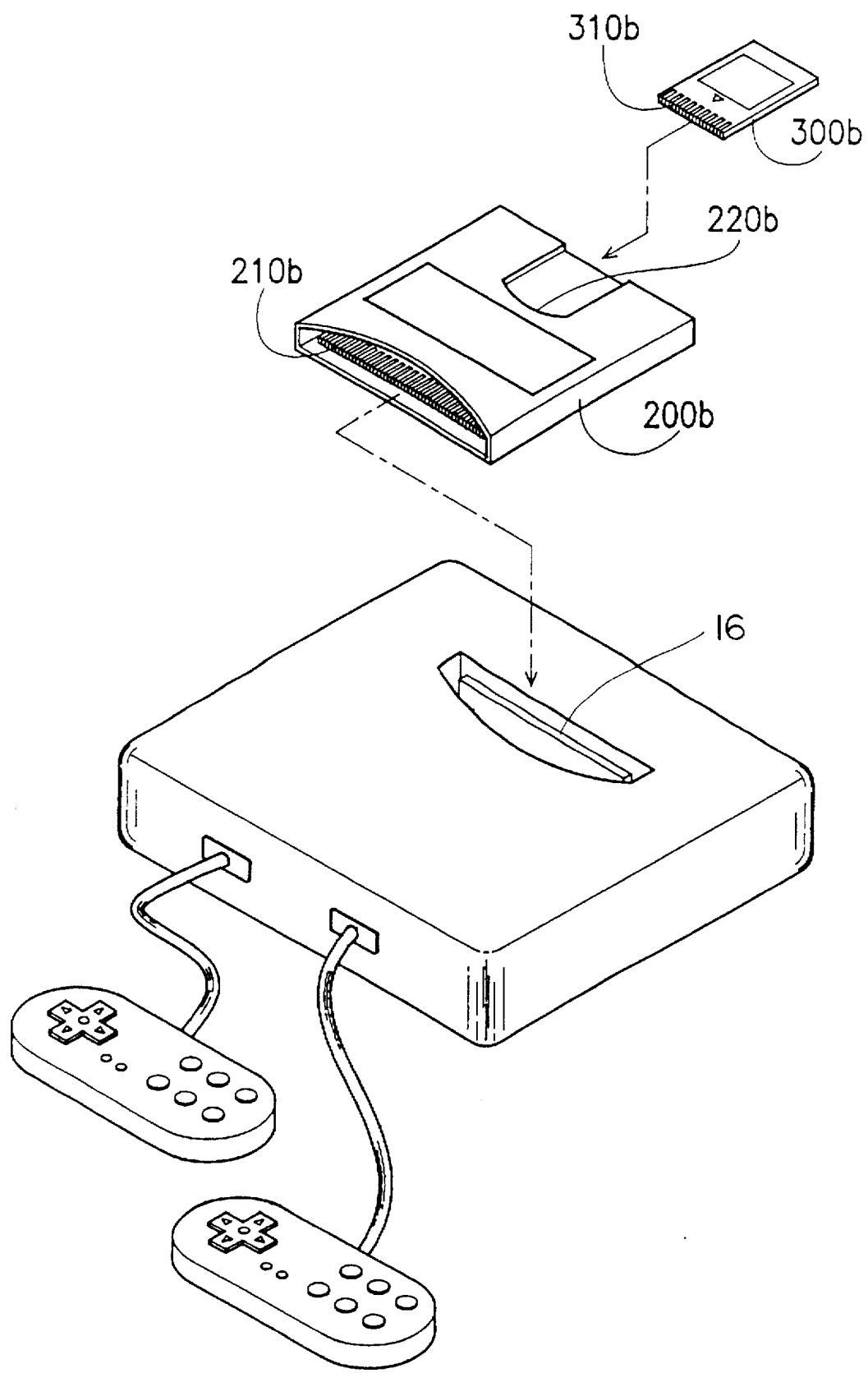
FIG. 3B is a perspective exploded diagram of another preferred embodiment according to the present invention.

Referring to FIG. 3A, a slot is located on the game console 10, and a connector 16 is located in the slot. The connector 16 can connect with the first connector 210a of the control cartridge 200a to combine the memory of the control cartridge 200a with the central processing unit of the game console 10. Meanwhile, the control cartridge 200a has a second connector 220a which can connect with the connector 310a of the add-on cartridge 300a, so that the add-on cartridge 300a can connect to the central processing unit of the game console 10 via the buses. An alternative embodiment of the game cartridge is illustrated in FIG. 3B. This approach comes in a smaller size than the previous one. The first connector 210b of the control cartridge 200b can connect with the connector 16 to combine the memory of the control cartridge 200b with the central processing unit of the game console 10. The control cartridge 200b has a second connector 220b which can connect with the connector 310b of the add-on cartridge 300b, so that the add-on cartridge 300b can connect to the central processing unit of the game console 10 via the buses.

Figure 4:
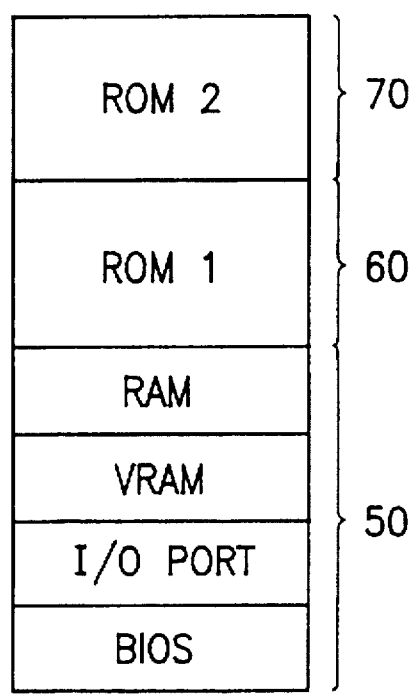
FIG. 4 is a diagram illustrating the memory layout of the memory address spacing of the game console according to the present invention.

Referring to FIG. 4, while the control cartridge and the add-on cartridge are connected to the game console at the same time, the available memory space for the games includes the interior memory space 50 of the game console, the memory space 60 of the primary cartridge and the memory space 70 of the add-on cartridge. The interior memory space 50 of the game console consists of ROM and RAM located therein, which includes the basic input/output system (BIOS) and the address of input/output port (I/O PORT), and video random access memory (VRAM) and RAM. The above RAM can be static RAM for temporarily storing data while the game is proceeding. Moreover, both the memory space 60 of the primary cartridge and the memory space 70 of the add-on cartridge consist of ROM.

Figure 5A:
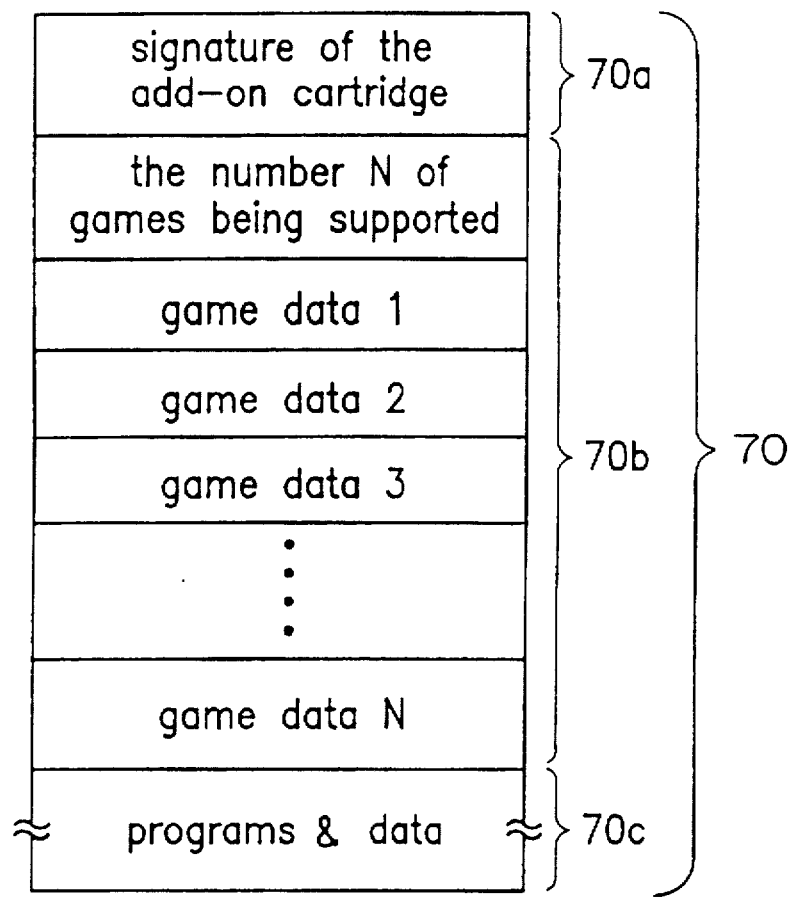
FIG. 5a and 5b are diagrams illustrating the different formats of data being stored the secondary (add-on) cartridge according to the present invention.
Figure 5B:
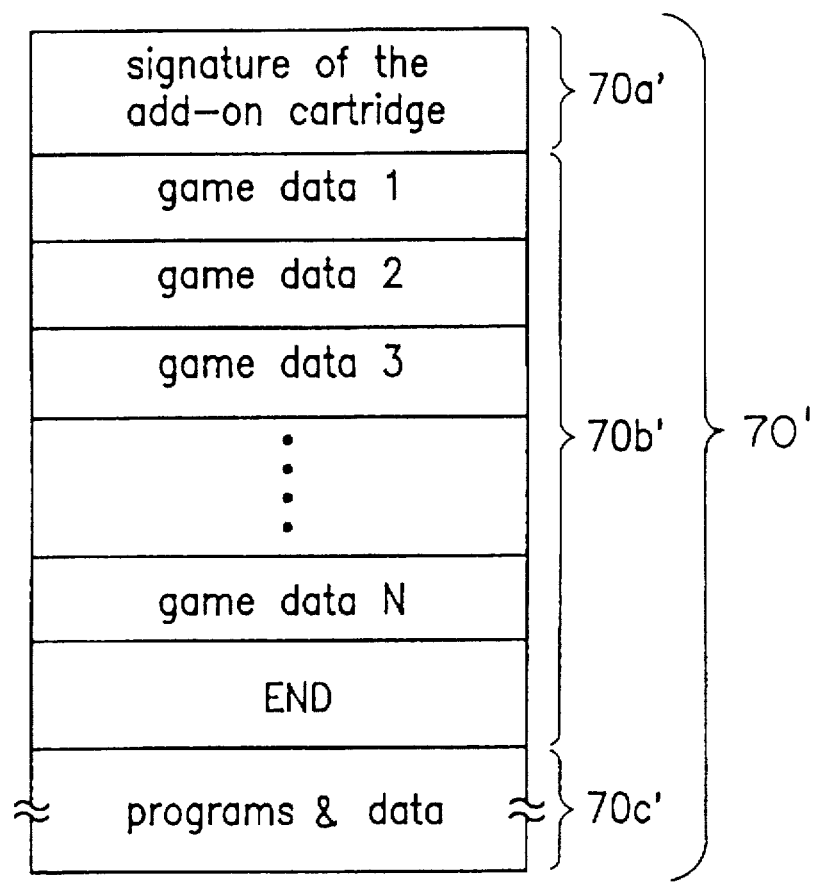

The format of data storage in the memory space 70 of the add-on cartridge can be arranged as shown in FIG. 5A or FIG. 5B. Referring to FIG. 5A, at the beginning of the memory space a signature is stored in a memory space 70a for identification of the add-on cartridge. Then the data being stored in the following memory space 70b represents a number for indicating the number of games being supported by the add-on cartridge. Next, the indices of the programs and data of each game are also stored in the memory space 70b. And the programs and data of each game are stored in the memory space 70c. Referring to FIG. 5B, another data storing format 70' also involves storing the signature at the beginning of the memory space, that is at the memory space 70a'. The indices of the programs and data of each game are then stored in the following memory space 70b', sequentially. And the index data END is stored at the end of the data of the memory space 70b ' to indicate that there is no further game data being provided. However, the programs and data of each game are stored in the memory space 70c '.

Figure 6:
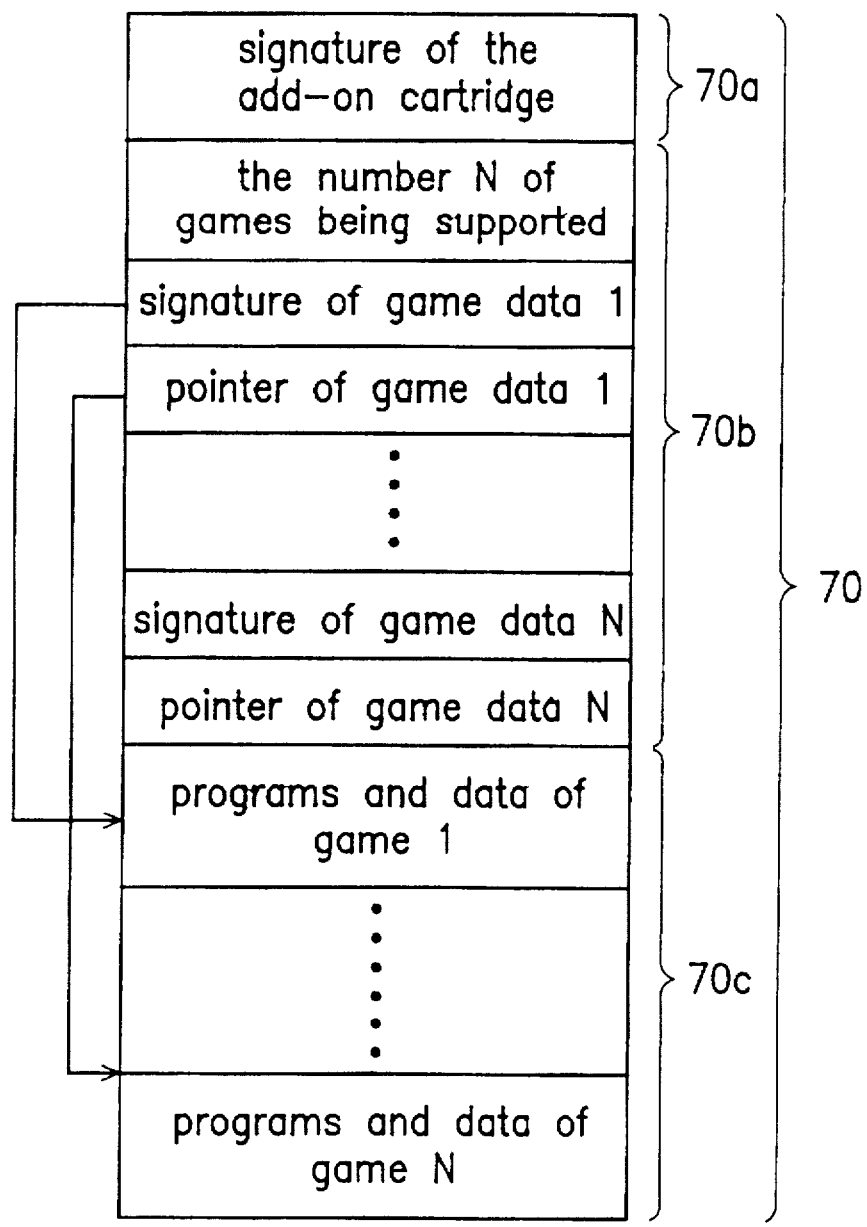
FIG. 6 is a diagram further illustrating the format of FIG. 5a in which various kinds of game data are stored.

The detailed format of game data being stored in the add-on cartridge can be also illustrated as shown in FIG. 6. The signature of the add-on cartridge is stored in the memory space 70a. Then the number of games being supported by the add-on cartridge, and the signatures and pointers of all games are stored in the following memory space 70b, so that the central processing unit can rapidly compare the signature of the control cartridge with the signatures of the games supported by the add-on cartridge. If all signatures of the add-on cartridge are not identical to the signature of the control cartridge, this means that the add-on cartridge does not support the game of the control cartridge. However, if there is one certain signature in the add-on cartridge identical to the signature of the control cartridge, this means that the add-on cartridge supports the game of the control cartridge. Therefore, the central processing unit of the game console can retrieve the data stored in the memory space 70c which is indicated by the pointer following the certain signature. The pointer data may include the start address and the end address of one memory space. Alternatively, the pointer data may include the base address and the offset address of one memory space. In such a way, the memory space storing one certain game data can be defined by the pointer data.

Figure 7:
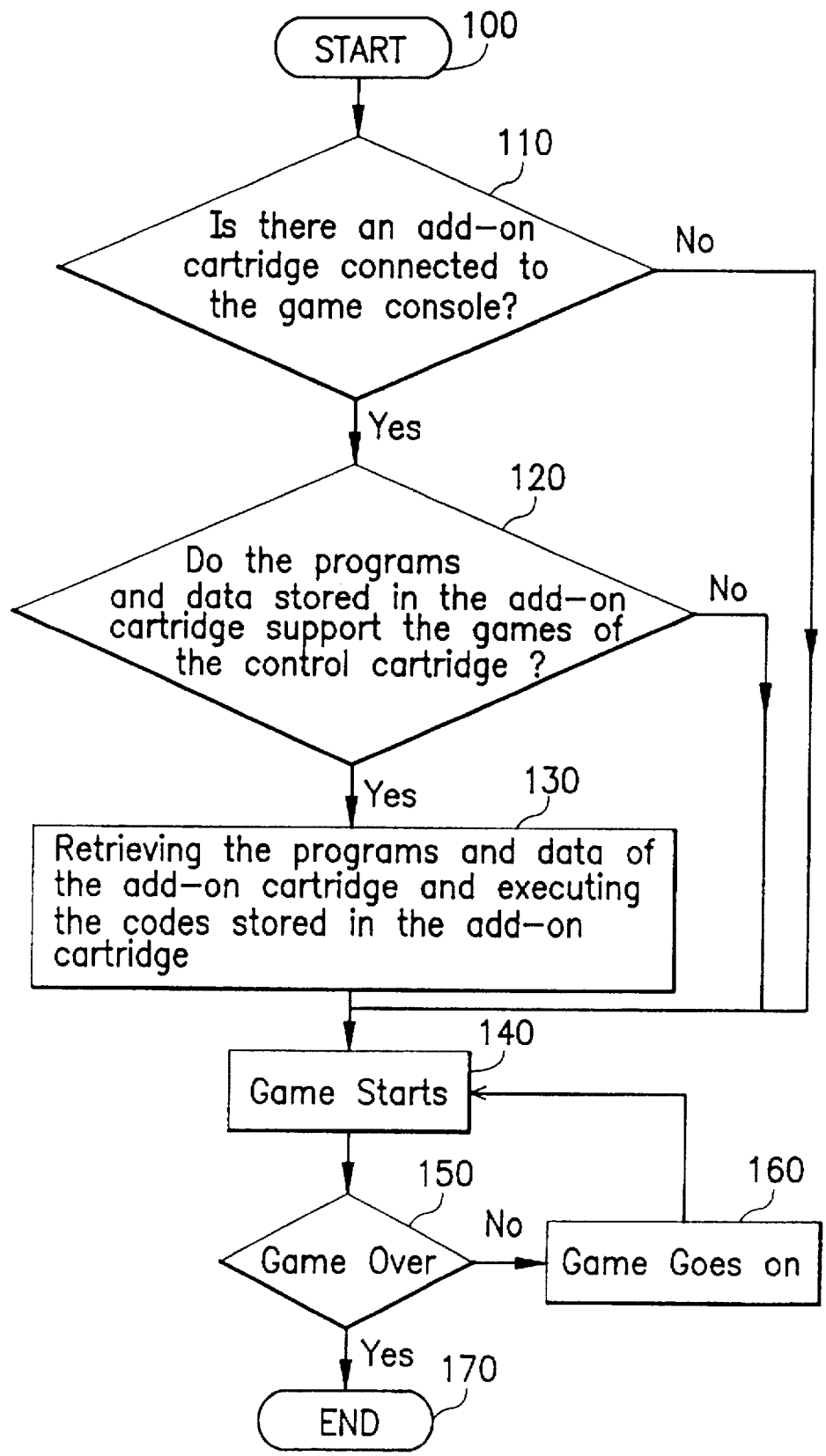
FIG. 7 illustrates the operating process of the present invention.

Referring to FIG. 7, the operating process of the present invention includes the following steps: (i) First of all, in step 100, plugging a control cartridge of the present invention in the game console and then turning on the game console; (ii)

secondly, in step 110, determining whether an add-on cartridge is connected to the control cartridge or not, in which the determining approach is to check for the existence of a signature of the add-on cartridge, for example, if the predetermined data which is built in the control programs to represent the signature of an add-on cartridge is AAFEh, the game console reads the signature data of the add-on cartridge connected to the control cartridge and compares it with AAFEh, then goes on the next step if the signature of the add-on cartridge is identical to AAFEh, otherwise the game console goes to step 140; (iii) in step 120, comparing the signature of the control cartridge with the signature of at least one game stored in the add-on cartridge by the game console under control of the control programs to determine whether the add-on cartridge supports the game of the software cartridge, and going to step 140 if the add-on cartridge does not support the game of the software cartridge, otherwise going on the next step; (iv) in step 130, retrieving additional game data stored in the add-on cartridge according to the pointer right after the signature identical to the signature of the control cartridge by the game console so as to execute the codes stored in the add-on cartridge; (v) then, in step 140, proceeding the game according to the modified executive codes; (vi) in steps 150 and 160, executing a routine to determine whether the game is over or not, and ending the process at step 170.

In the above operating process, the steps 110 to 130 can be regarded as the characteristic of the present invention, which include determining whether there is an add-on cartridge connected or not, determining whether the add-on cartridge supports the game of the control cartridge or not, and executing the codes according to the game data and/or programs being retrieved from the add-on cartridge. These steps must be built into the control programs in advance while manufacturing the control cartridge, the control cartridge is thus able to be extensible with additional data and/or programs.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A software cartridge being extensible with additional data and/or programs, which can connect to a game console, said software cartridge comprising:

at least one memory for storing game data and a control program to control the execution of a game;

a first connector for connecting said software cartridge to the game console, so that the game console can retrieve the game data to execute the game by the control program;

a second connector for connecting said software cartridge with an add-on cartridge, wherein the add-on cartridge is stored with game data and/or programs supporting the game of said software cartridge, said software cartridge being able to identify and retrieve the game data and/or programs stored in the add-on cartridge under control of the control program, so as to execute the codes in the add-on cartridge.

2. A software cartridge as claimed in claim 1 wherein the add-on cartridge is stored with various kinds of game data and/or programs.

3. A software cartridge as claimed in claim 1 wherein the memory is ROM.

4. A software cartridge as claimed in claim 1 wherein the first connector and the second connector are connected to the game console by a common bus.

5. A software cartridge being extensible with additional data and/or programs, which can connect to a game console, said software cartridge comprising:

at least one memory for storing a signature of said software cartridge, and data of a game;

a first connector for connecting said software cartridge to the game console, so that the game console can execute the game according to the data stored in the memory;

a second connector for connecting said software cartridge with an add-on cartridge, the add-on cartridge storing a signature of the add-on cartridge and additional data and/or programs of at least one game, said software cartridge having means to identify and retrieve the additional game data and/or programs stored in the add-on cartridge which support the game of said software cartridge under control of the game data, so as to execute codes in the add-on cartridge.

6. A software cartridge as claimed in claim 5 wherein the memory is ROM.

7. A software cartridge as claimed in claim 5 wherein the first connector and the second connector are connected to the game console by a common bus.

8. A software cartridge as claimed in claim 5, further comprising a number data representing the number of games supported by the add-on cartridge, which is stored between the signature and the additional game data of the add-on cartridge.

9. A software cartridge as claimed in claim 8, wherein the additional game data includes data of a game, a signature of the game, and a pointer for indicating a storing position of the data of the game.

10. A software cartridge as claimed in claim 5, further comprising an end data which is stored after the additional game data.

11. A software cartridge as claimed in claim 10, wherein the additional game data includes data of a game, a signature of the game, and a pointer for indicating a storing position of the data of the game.

12. A software cartridge as claimed in claims 5, wherein the additional game data includes data of a game, a signature of the game, and a pointer for indicating a storing position of the data of the game.

13. A method for extending additional data and/or programs to a software cartridge, comprising the steps of:

(i) determining whether an add-on cartridge is connected to the software cartridge by a game console under control of control programs stored in the software cartridge, and if there is no add-on cartridge connected to the software cartridge, directly executing a game of the software cartridge;

(ii) comparing the signature of the software cartridge with the signature of at least one game stored in the add-on cartridge by the game console under control of the control programs to determine whether the add-on cartridge supports the game of the software cartridge, and if the add-on cartridge does not support the game of the software cartridge, directly executing a game of the software cartridge;

(iii) retrieving additional game data stored in the add-on cartridge, which support the game of the software cartridge, by the game console so as to execute codes in the add-on cartridge.

14. A method as claimed in claim 13 wherein the add-on cartridge is stored with data of various kinds of games.

15. Method as claimed in claim 14 wherein the format of storing the data of plural kinds of games is designed to sequentially store signatures and pointers of the various kinds of games, then to store game data and/or programs.

16. A method as claimed in claim 13 wherein the add-on cartridge is sequentially stored with a signature data of the add-on cartridge, a number data for indicating the number of games supported by the add-on cartridge, and game data and/or programs.

17. A method as claimed in claim 13 wherein the add-on cartridge is sequentially stored with a signature data of the add-on cartridge, game data and/or programs, and an end data for indicating the end of the game data and/or programs.

18. A video game system being extensible with additional data and/or programs, comprising:

a game console;

a software cartridge and an add-on cartridge;

wherein the add-on cartridge interfaces with the software cartridge and includes data of at least one game and signatures respectively representing the add-on cartridge and the game data, and wherein the software cartridge interfaces with the game console and includes control programs which can make the game console determine whether the add-on cartridge is connected to the software cartridge.

* * * * *